United States Patent
Anders

[11] 4,455,112
[45] Jun. 19, 1984

[54] ENCLOSURE CONSTRUCTION FOR REMOTE BANKING PNEUMATIC TUBE SYSTEMS

[75] Inventor: Walter G. Anders, North Canton, Ohio

[73] Assignee: Diebold, Incorporated, Canton, Ohio

[21] Appl. No.: 374,014

[22] Filed: May 3, 1982

[51] Int. Cl.³ .............................................. B65G 51/26
[52] U.S. Cl. .................... 406/110; 406/191; 138/112; 138/161; 292/256.71
[58] Field of Search ............... 406/110, 111, 112, 191; 138/112, 113, 163, 161; 52/220, 221; 292/256.71, 256.73; 174/47

[56] References Cited

U.S. PATENT DOCUMENTS

| | | |
|---|---|---|
| 3,196,495 | 7/1965 | Owen. |
| 3,599,898 | 8/1971 | Bontempelli. |
| 3,631,789 | 1/1972 | Kinsey. |
| 3,714,750 | 2/1973 | Pallotto. |
| 4,038,802 | 8/1977 | Bajorek et al. . |
| 4,233,816 | 11/1980 | Henlsey. |

*Primary Examiner*—Jeffrey V. Nase
*Assistant Examiner*—Daniel R. Edelbrock
*Attorney, Agent, or Firm*—Frease & Bishop

[57] ABSTRACT

An enclosure construction for pneumatic tubes and power and control cables installed overhead for remote visual auto teller banking systems which is inexpensive and attractive and readily installed. The enclosure includes plastic half sections which are snap-engaged along laterally opposite longitudinal joints having weather seals therein. One of the plastic half sections is fixed internally to a semicircular clamping member which cooperates with a second clamping member. The clamping members are clamped to the pneumatic tube before one of the plastic enclosure members is assembled with the other.

9 Claims, 7 Drawing Figures

ENCLOSURE CONSTRUCTION FOR REMOTE BANKING PNEUMATIC TUBE SYSTEMS

CROSS-REFERENCE TO RELATED PATENTS AND PATENT APPLICATIONS

The new enclosure construction for overhead installation of pneumatic tubes for remote visual auto teller banking systems constitutes an improvement over the pneumatic tube location and installation in the Anders et al. U.S. Pat. No. 4,059,246 and may be used to connect customer terminals for such banking systems as disclosed in the Anders application Ser. No. 156,690, U.S. Pat. No. 4,343,574, dated Aug. 10, 1982 with teller terminals such as shown in Anders application Ser. No. 178,559, U.S. Pat. No. 4,352,603, dated Oct. 5, 1982.

BACKGROUND OF THE INVENTION

1. Field of the Invention

The invention relates to remote banking equipment in which a pneumatic tube conveyor is installed connecting a remote drive-up customer terminal at a customer station accessible to a customer in a vehicle stopping at the customer station, and a teller terminal at a teller station within a bank building where a teller may view through a window a customer located at the customer station. Such remote banking equipment frequently is referred to as a visual auto teller system and installations of such systems such as shown in U.S. Pat. No. 4,059,246 frequently use underground tunnels connecting the teller and customr terminals through which the pneumatic tube conveyors, and power and control cables extend to protect the pneumatic tubes and cables from varying weather conditions that may occur in the area of the remote banking installation.

More particularly, the invention relates to a visual auto teller system installation wherein the pneumatic tubes and power and control cables are installed to run overhead between customer and teller terminals. Such overhead installations eliminate excavation and tunnel construction as well as the cost thereof for connecting each customer station with its teller station.

Also, the invention relates to the provision of a simple, inexpensive, easily installed enclosure for metal pneumatic tubes and their power and control cables which may have an unsightly appearance, which dresses up the overhead visual auto teller installation and presents a pleasing and enhanced appearance for the installation.

In addition, the invention relates to such decorative enclosures which may be used to cover a pneumatic tube that has interconnected curves and vertical and horizontal portions or runs which extend between customer and teller terminals, wherein the enclosed horizontal pneumatic tube portions are conveniently located below a canopy or hood covering a drive-up visual auto teller installation area where a number of customer terminals may be located.

Finally, the invention relates to such an enclosure construction which adequately protects the pneumatic tube and its power and control cables in a weather-sealed condition and free of exposed protrusions or hardware.

2. Description of the Prior Art

Prior attempts have been made to dress up the appearance of overhead visual auto teller pneumatic tubes by local contractors who have installed such systems, designing their own concept of makeshift unattractive covers for the pneumatic tubes.

Numerous prior art devices are known which have been used as enclosures in other fields. For example, U.S. Pat. No. 4,233,816 shows an enclosure for a main tube, duct or line for conveying fluid refrigerants. The main tube is surrounded by a snap-assembled device radially spaced from the main tube which provides mounts for heat transfer conduits. Radiation shields are located in the spaces between the heat transfer conduits and the main tube, as well as spaced from and surrounding the heat transfer conduits.

Decorative enclosures (U.S. Pat. Nos. 3,714,750 and 3,196,495) have been provided for building posts or round columns wherein the enclosure members are secured to the posts or columns by screws extending through the walls of the hollow posts or columns. Such enclosure screw mounts cannot be tolerated projecting into a pneumatic conveyor tube.

Railing spindle covers also are known (U.S. Pat. No. 4,038,802) that have mating sections that are longitudinally interlocked together around each spindle extending between top and bottom rails. Interfitting metal cover members are known (U.S. Pat. No. 3,631,789) which are snapped together to enclose oval ceramic chimney flue members. Neither of these devices could be used in any way to enclose a pneumatic tube.

None of the prior devices referred to above constitutes a simple weather-sealed enclosure of inexpensive construction which may be easily applied to a pneumatic tube and its power and control cables extending in vertical, horizontal and curved locations between visual auto teller customers and teller terminals to provide a decorative appearance for such an installation.

Accordingly, there is an existing need in the field of remote visual auto teller pneumatic tube systems for a weather-sealed enclosure presenting an attractive, pleasing and decorative appearance for overhead-installed pneumatic tubes of such systems, which eliminate the necessity for underground tunnel connection between customer and teller pneumatic tube system terminals.

SUMMARY OF THE INVENTION

Objectives of the invention include providing an attractive, pleasing and decoratively appearing enclosure construction for overhead-installed pneumatic tubes and power and control cables for remote visual auto teller pneumatic tube systems; providing such an enclosure construction which is weather-sealed; providing such an enclosure construction which is simple, inexpensive and easily installed to protect a usually metal pneumatic tube and the power and control cables for the pneumatic tube system, the assembled enclosure being clamped to the tube and the cables being mounted within the enclosure on the enclosure clamps; providing such an enclosure construction which is readily installed in sections along straight and curved portions of the tube with enclosure section adjacent ends being telescopically connected; providing such an enclosure construction wherein any enclosure section comprises a pair of molded plastic material members longitudinally snap-engaged at diametrically opposite locations forming longitudinal joints having weather-sealing members seated in the longitudinal joints maintaining said snap-engagement; providing such an enclosure construction in which one enclosure member of each pair is fixed to the enclosure clamps at the telescoped end connections between paired enclosure member sections; providing such an enclosure construction in which the enclosure clamps which mount the paired enclosure member sections on the pneumatic tube each comprises first and second semicircular clamp members, the first of which at one end has releasable hook engagement with one end of the second clamp member and at the other end has bolted connection with the other end of the second clamp member, and in which one of the paired enclosure section members has bolted connection at each longitudinal edge portion to the ends of said second semicircular clamp member; providing such an enclosure construction in which spaced, releasable clamping devices are mounted on said second semicircular clamp member for clamping the power and control cables at spaced locations to said second semicircular clamping member; and providing such an enclosure construction and mode of assembly which achieves the stated objectives and satisfies a need that has existed in the field of overhead tube installation of remote visual auto teller pneumatic tube banking systems.

These and other objectives and advantages may be obtained by the construction stated in general terms as enclosure construction for pneumatic tubes and power and control cables installed overhead for remote visual auto teller banking systems; including a tubular enclosure section, generally rectangular in cross section, having paired half-members with laterally spaced longitudinal edge formations each having concave portions; said spaced edge formations of said bolt members being snap-engaged to four laterally spaced longitudinal joints; said concave portions when said edge formations are snap-engaged being in spaced relation defining an outward opening groove along each longitudinal joint; a gasket in each groove engaged with said spaced concave portions throughout each joint; separable clamp members clamped to a pneumatic tube being enclosed; and means connecting at least one of said paired enclosure members with at least one of said clamp members.

BRIEF DESCRIPTION OF THE DRAWINGS

A preferred embodiment of the invention—illustrative of the best mode in which applicant has contemplated applying the principles—is set forth in the following description and shown in the drawings and is particularly and distinctly pointed out and set forth in the appended claims.

Similar numerals refer to similar parts throughout the various figures of the drawings.

DESCRIPTION OF THE PREFERRED EMBODIMENT

A pneumatic tube banking system incorporating the concepts of the invention is of a type which permits communication and physical banking transactions between a customer, at a remote station and a bank teller located inside a bank building, preferably with visual communication between the teller and the customer and verbal communication by a usual and known audio system.

A remote customer station preferably is located where a customer in an automobile may drive to the station where he may see the bank teller through a window in the bank building and where a bank teller in the bank building may see a customer in the auto at the customer station. Several customer stations may be served by one teller with visual communication between the teller and customer at all of the several customer stations.

Such a visual auto teller installation is shown in U.S. Pat. No. 4,059,246 and a typical customer terminal for such a visual auto teller installation is shown in my application Ser. No. 156,690 (now U.S. Pat. No. 4,343,574), while a typical teller terminal for such an installation is shown in my application Ser. No. 178,559 (now U.S. Pat. No. 4,352,603). The customer and teller terminals of said application Ser. Nos. 156,690 and 178,559 are adapted to be connected with a pneumatic tube either overhead or underground as generally illustrated in U.S. Pat. No. 4,059,246. It is most desirable to eliminate underground tunnels for the connecting pneumatic tubes, in order to substantially reduce the cost of installation of remote visual auto teller systems having a plurality of customer stations.

Figure 1:
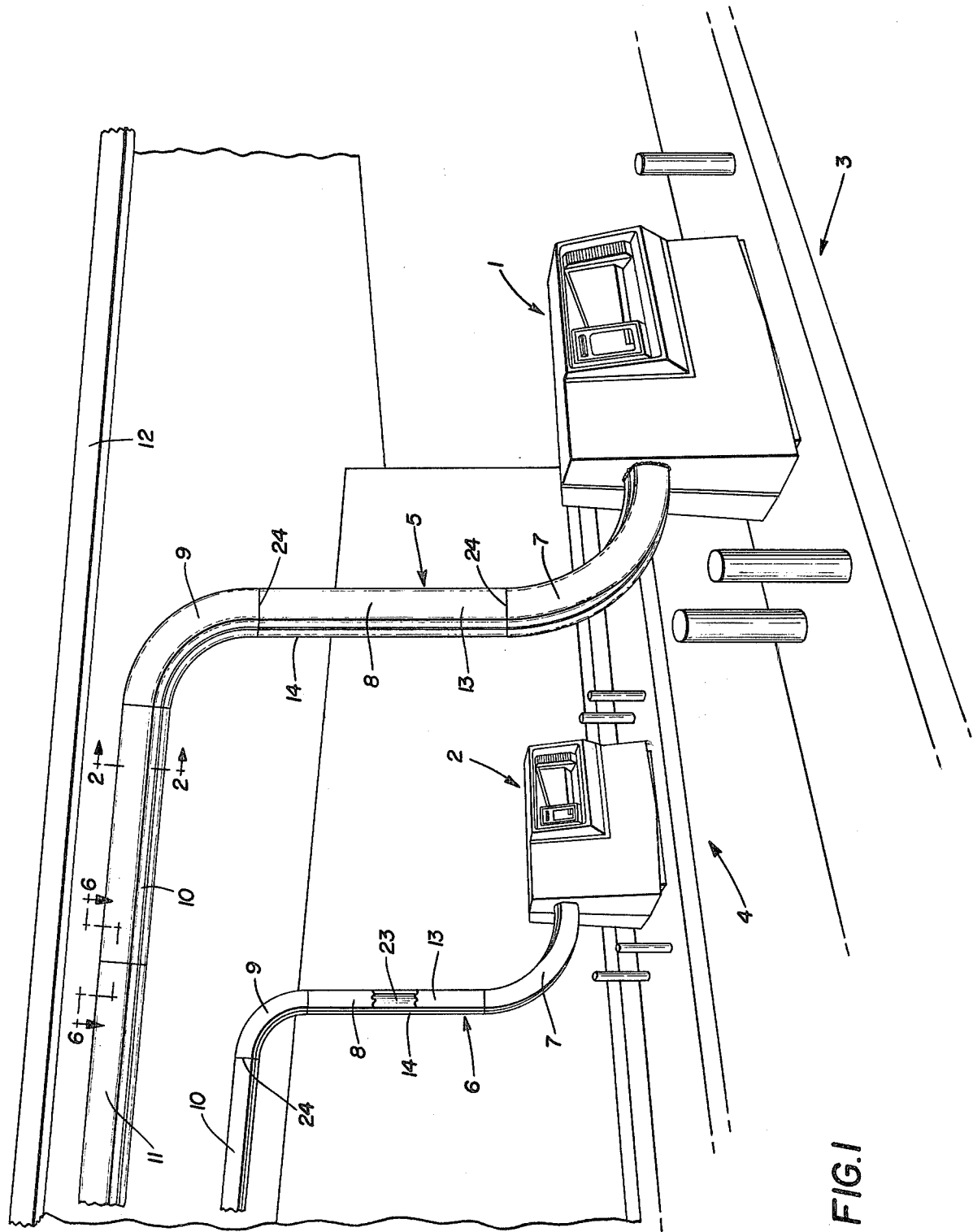
FIG. 1 is a somewhat diagrammatic perspective view of a plurality of customer terminals of a remote visual auto teller pneumatic tube banking system installation with pneumatic tubes and power and control cables therefor installed overhead.

FIG. 1 illustrates somewhat diagrammatically overhead pneumatic tubes installed to connect two customer terminals 1 and 2 at customer stations generally indicated at 3 and 4. The terminals 1 and 2 may be customer terminals such as shown in said application Ser. No. 156,690. The overhead pneumatic tube connections for customer terminals 1 and 2 are, respectively, indicated generally at 5 and 6, and these pneumatic tube connections may extend to and be connected with teller terminals such as shown in said application Ser. No. 178,559.

The tube connections 5 and 6, as shown, each comprise an upwardly curved section 7, a vertical section 8, another curved section 9 and usually a plurality of horizontal sections such as indicated at 10 and 11.

The tube connection sections 10 and 11 normally are located below a roof or canopy 12 and extend into a bank building teller station where they are connected with mating teller terminals. The tube connections, including sections 7 through 11, manifestly are very visible, and the pneumatic tubes thereof are enclosed in the enclosure construction of the invention to present a pleasing and attractive, rather than an unsightly appearance when uncovered.

There may be an enclosure section for each tube connection section 7, 8, 9, 10, 11, etc. The construction of only one of such enclosure sections is described below since each comprises the same components (FIGS. 2, 3, 4 and 5).

Each enclosure section is tubular, generally rectangular in cross section, having paired preferably channel-shaped half members 13 and 14 (FIGS. 2, 3 and 5) provided with preferably slightly curved webs 15 and longitudinal flanges 16 and 17 with edges snap-engaged at laterally opposite grooved joints. Members 13 and 14 are molded of high-density polyethylene plastic material.

The flanges 16 and 17 of member 13 terminate in inturned concave portions 18 from which a flange 19 extends. Each flange 19 has a Z-shaped strip 20 (FIGS. 2 and 5) cemented or otherwise connected or fixed to said flange 19 spaced from the concave portion 18 to form with the portion 18 an outwardly open groove 21. These grooves proceed longitudinally along the ends of flanges 16 and 17 which extend the entire length of any enclosure member 13, whether the member forms an enclosure for a curved tube section 7 or 9 or a straight tube section 8, 10 or 11 as shown in FIG. 1.

The flanges 16 and 17 of the enclosure member 14 of a pair have terminal edge formations comprising laterally spaced, longitudinally extending, inturned, concave flanges 22 (FIGS. 3 and 5), which are different from the formations just described that are present on enclosure member 13.

Any paired enclosure members 13 and 14 when assembled to form an enclosure section of desired shape and length have typical overlapped tubular telescoped joints with paired enclosure sections adjacent the ends of such paired members throughout the length of the pneumatic tubing being enclosed which extends between the customer and teller terminals, the pneumatic tubing being indicated generally at 23 (FIGS. 2, 3, 4, 6 and 7).

At each joint 24 between enclosure sections, generally indicated by a line, a clamp is used to mount the enclosure sections on the pneumatic tube 23. Each clamp comprises first and second generally semicircular clamp members 25 and 26. The first clamp member 25 has a hook 27 at one end and an angled tab 28 at its other end. The second clamp member 26 has an out-turned flange 29 at one end formed with a slot 30 in which the hook 27 of member 25 is engaged. The flange 29 terminates in a lateral flange 31 formed with out-turned tabs 32 and 33 and which are separated at 34 and are offset with respect to one another as shown in FIGS. 2 and 4.

The other end of second clamp member 26 has an out-turned flange 35 similar to tab 28 and flange 29, a lateral flange 36 and out-turned offset tabs 37 and 38 similar to offset tabs 32 and 33, respectively. Spaced bolt holes 39 are formed at spaced locations in lateral flanges 31 and 36. A bolt hole 40 is formed in out-turned flange 35 of second clamp member 26 located to match a similar bolt hole 41 in angled tab 28 of first clamp member 25.

Figure 4:
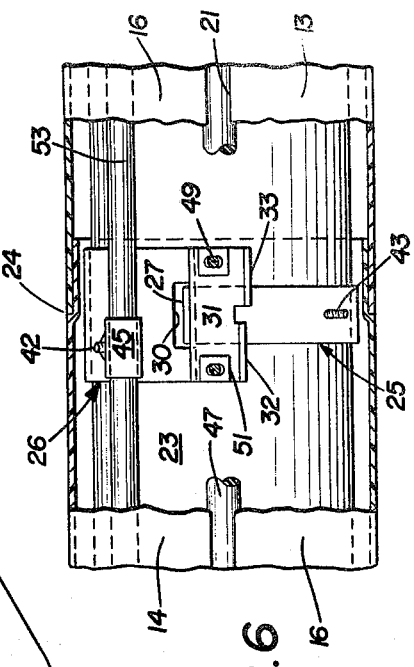
FIG. 4 is an exploded perspective view of a portion of a pneumatic tube, of segments of the weather-sealing strip members, and of various clamp components.

Studs 42 are fixed to and project from second clamping member 26, and preferably a spare stud 43 similarly is mounted on clamping member 25 (FIG. 4). Clamping brackets 44 and 45 may be mounted on the studs 42 on second clamping member 26 and assembled thereto by nuts 46.

Figure 2:
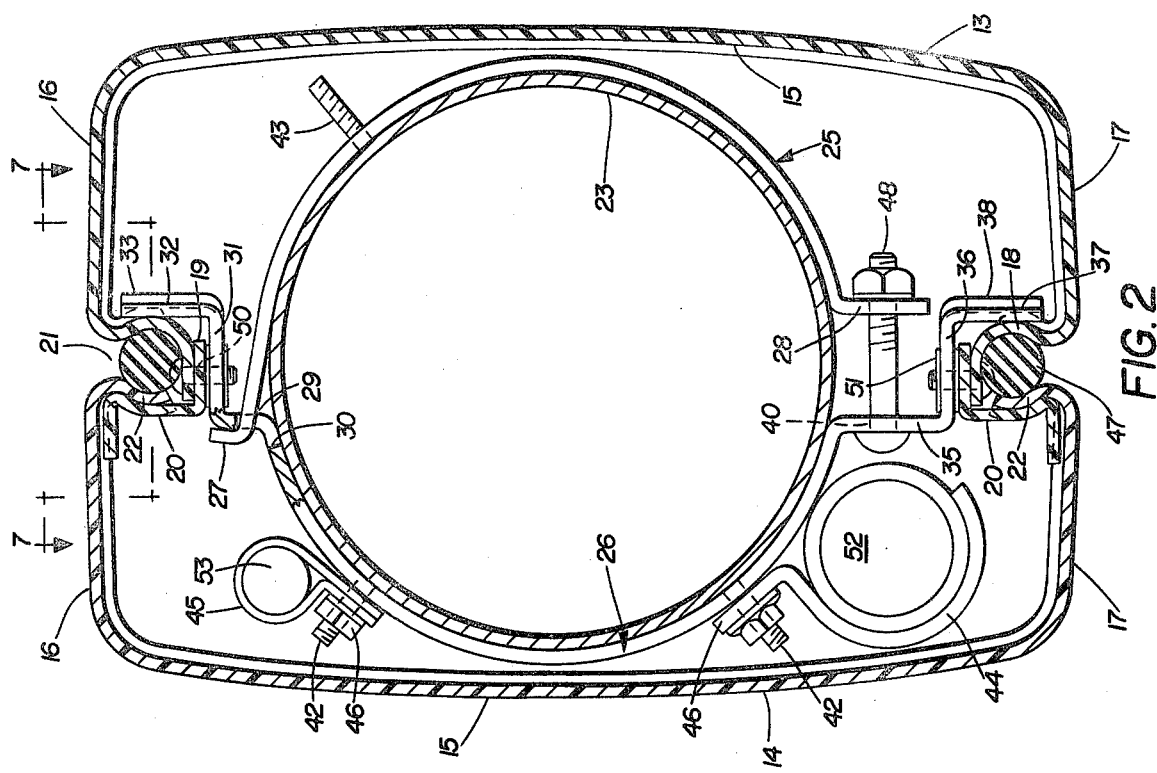
FIG. 2 is a greatly enlarged cross-sectional view of a pneumatic tube with the new enclosure construction therefor taken on the line 2—2, FIG. 1.
Figure 3:
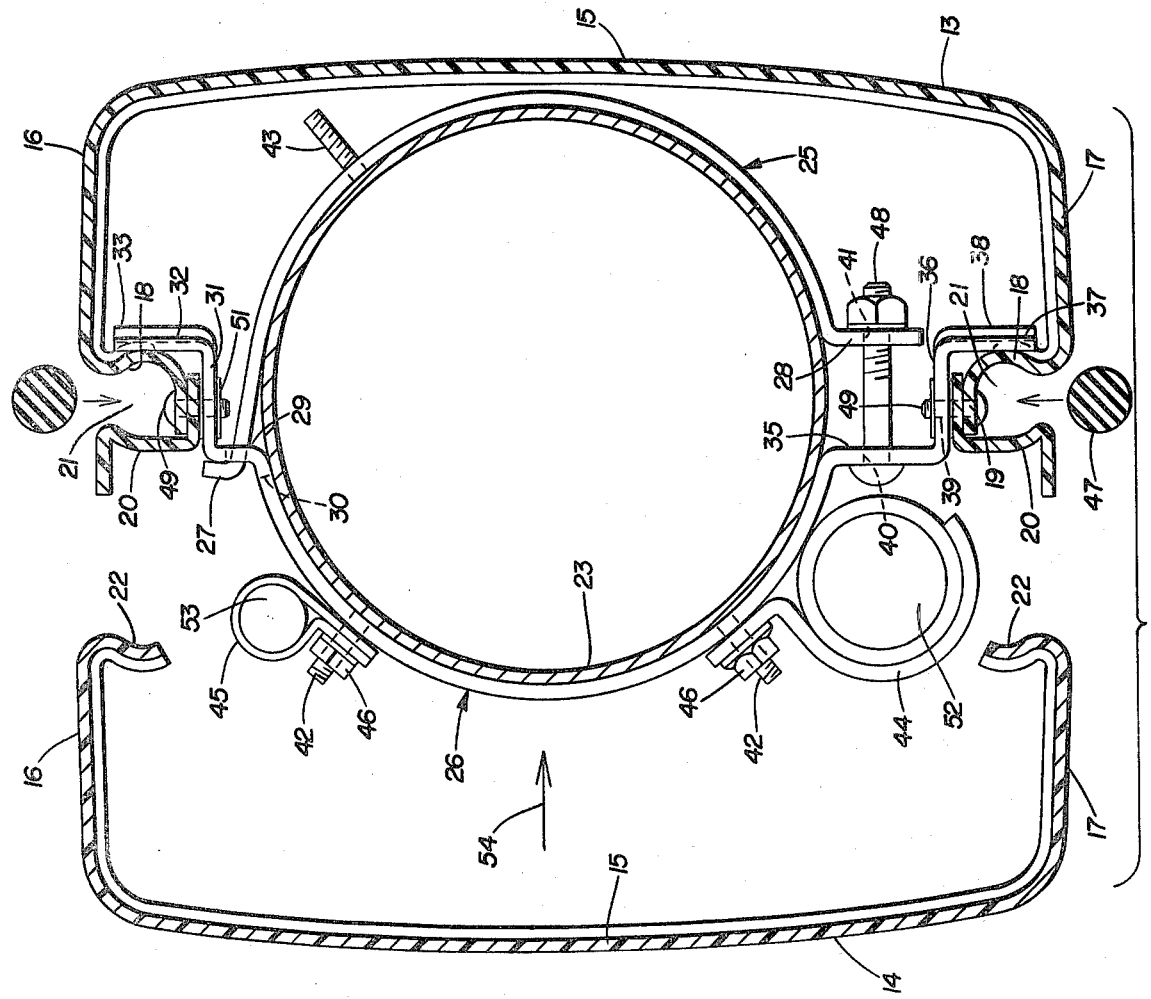
FIG. 3 is an exploded view of the parts shown in FIG. 2 before the members of a pair of enclosure members are snap-engaged, and before round weather-sealing strip members are inserted in the snap-engaged joints between the paired enclosure members.

Round strip elastomeric gaskets 47 are used as weather seals to seal the longitudinal joints between the enclosure members 13 and 14 as described below (FIGS. 2 and 3).

Figure 5:
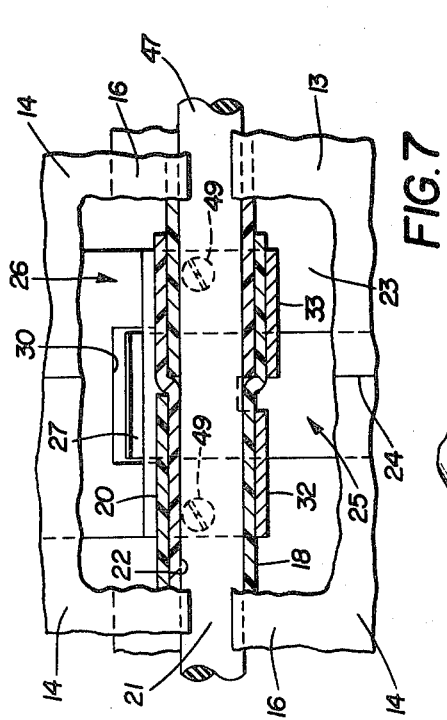
FIG. 5 is an exploded perspective view of portions of a pair of enclosure members before assembly.
Figure 7:
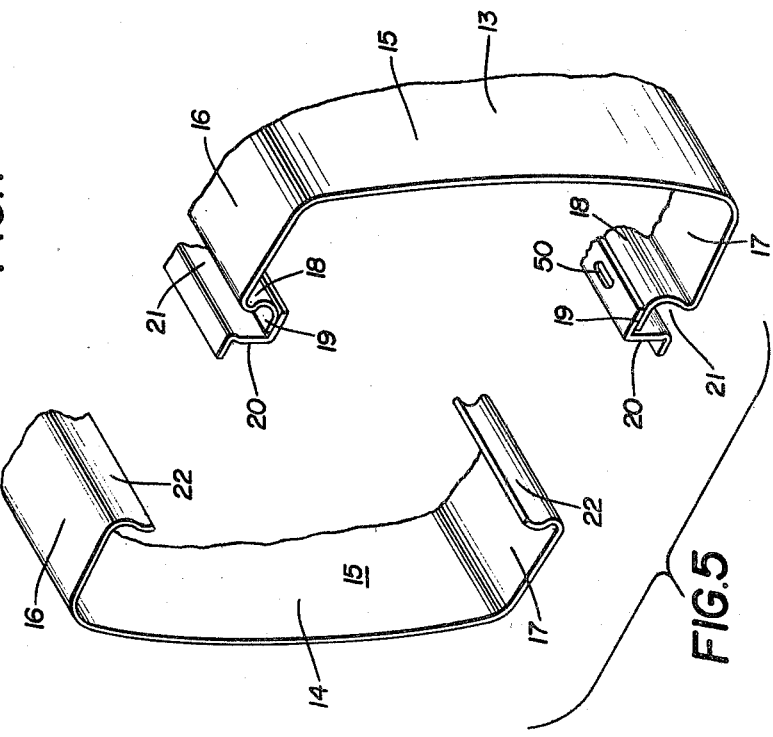
FIG. 7 is a fragmentary view with parts broken away and in section taken on the line 7—7, FIG. 2.

The various components shown in FIGS. 4 and 5 are assembled to form the new enclosure for the pneumatic tube 23 by initially engaging the hook 27 of the first clamping member 25 in the slot 30 of second clamping member 26 and placing the clamping members around the pneumatic tube 23 generally at the location of a joint to be formed between two adjacent ends of paired enclosure members forming an enclosure section. The first and second semicircular clamping members then are clamped together tightly around pneumatic tube 23 by a bolt 48 engaged in clamping member openings 40 and 41 as shown in FIG. 3.

Figure 6:
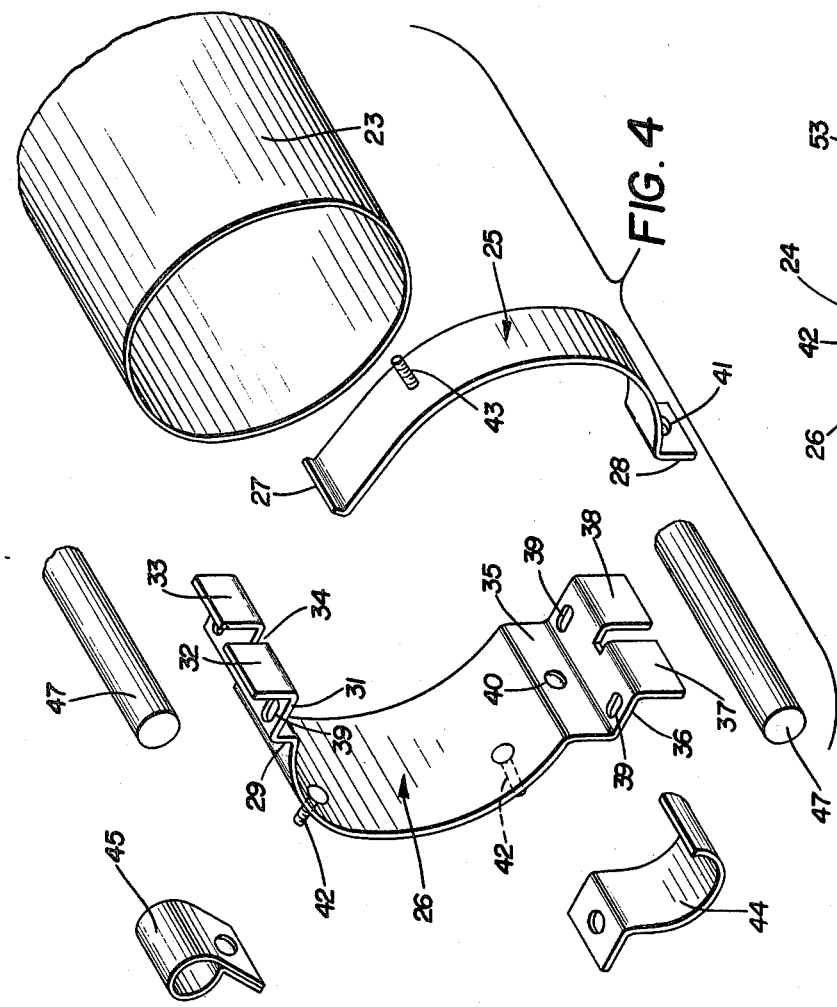
FIG. 6 is a fragmentary view with parts broken away and in section taken on the line 6—6, FIG. 1.

Enclosure channel member 13 which, being formed of plastic material, is flexible, has the walls of its grooves 21 sprung over the tabs 32 and 33 at the ends of the second clamping member 26 as shown in FIG. 3. Then screws 49 are inserted through opening 50 in the web of the channel walls which form the groove 21, at the ends of the enclosure member 13, and through bolt holes 39 in the lateral flanges 31 and 36 of second clamping member 26 to engage speed nuts 51 (FIGS. 2 and 6). In this manner the enclosure member 13 is secured by the clamp 25-26 to the pneumatic tube 23.

Before or after securing the enclosure member 13 to the pneumatic tube 23, a power conduit or cable 52 is clamped by clamp bracket 44, nut 46 and stud 42 to the second clamp member 26 and thus is mounted on the pneumatic tube 23. Similarly, a control cable 53 is mounted by clamp 45 on one of the studs 42 carried by the second clamping member 26. At this stage of assembly the various components are as shown in FIG. 3 before the enclosure assembly is completed.

To complete the assembly of enclosure members 13 and 14, the member 14 is moved generally in the direction of the arrow 54, and the concave inturned flanges 22 are sprung into the grooves 21 to secure the members 13 and 14 as a pair surrounding the pneumatic tube 23 and enclosing the various clamps and power and control cables therein (FIGS. 2 and 3).

Additional paired enclosure members in sections are assembled on and surrounding the pneumatic tube 23 throughout its extent between a customer terminal and a teller terminal connected by the pneumatic tube. Finally, a weather-seal strip gasket 47 is forced into the laterally opposite grooves 21 throughout their length to provide weather seals between the enclosure members 13 and 14 of each pair and of adjacent connected pairs.

The gaskets 47 function further to maintain the paired enclosure members 13 and 14 in assembled condition by engaging and pressing against the concave formations of flanges 22 and inturned portions 18.

The completely assembled relationship of the various components of the decorative enclosure construction for a pneumatic tube 23 is best illustrated in FIG. 1 and particularly in FIG. 2.

Accordingly, the new enclosure construction of the invention provides an inexpensive and attractive enclosure for housing a pneumatic tube and power and control cables therefor in order to avoid the unsightly appearance of exposed tubes and hardware or the makeshift devices built on the job by pneumatic tube system installation contractors. Thus, the objectives of the invention are achieved, and a want which has existed in the field of remote drive-up visual auto teller installations is overcome and satisfied, and the necessity for expensive underground communication for such pneumatic tube auto teller installations is eliminated.

In the foregoing description, certain terms have been used for brevity, clearness and understanding but no unnecessary limitations are to be implied therefrom beyond the requirements of the prior art because such terms are used for descriptive purposes and are intended to be broadly construed.

Moreover, the description and illustration of the invention is by way of example and the scope of the invention is not limited to the exact details shown or described, since it is manifest that any number of pneumatic tube connections for visual auto teller banking systems may be installed at one general area and supplied with the new enclosure construction.

Having now described the features, principles and cooperative relationships of the new enclosure construction, and the advantageous, new and useful results obtained, the new structures, devices, components, elements, arrangements, parts, combinations and relationships are set forth in the appended claims.

I claim:

1. Enclosure construction for pneumatic tubes and power and control cables installed overhead for remote visual auto teller banking systems; including a tubular enclosure section generally rectangular in cross section having first and second paired half-members with laterally spaced, longitudinally extending, edge formations; each edge formation on the first paired half-member comprising an inturned concave flange and a Z-shaped portion connected to said concave flange and spaced therefrom to form an outwardly opening groove; each edge formation on the second paired half-member comprising an inturned concave flange; the spaced second paired half-member concave flanges being snap-engaged, respectively, with the Z-shaped portions of the spaced first paired half-member to form laterally spaced joints in the enclosure section; a gasket in each groove engaged with the concave flanges of the first and second paired half-members along each joint; separable clamp members clamped to a pneumatic tube being enclosed; and means connecting at least one of said paired half-members with at least one of said clamp members.

2. The enclosure construction defined in claim 1 in which the separable clamp members comprise first and second semicircular clamp members, one end of the first clamp member being releasably hook-engaged with one end of the second clamp member, the other ends of said first and second clamp members being bolted together.

3. The enclosure construction defined in claim 2 in which one of the paired half-members is connected to each end of said second clamp member.

4. The construction defined in claim 3 in which the second clamp member is provided with a spaced pair of studs on each of which studs a clamp bracket is releasably connected, and in which said clamp brackets are adapted to clamp tube system power and control cables, respectively, to said second clamp member.

5. The enclosure construction defined in claim 1 in which one of the separable clamp members is provided with a spaced pair of studs on each of which studs a clamp bracket is releasably connected, and in which said clamp brackets are adapted to clamp tube system power and control cables, respectively, to said one clamp member.

6. The enclosure construction defined in claim 1 in which the gasket in each groove is a round thermoplastic strip gasket in each of said grooves providing weather seals for the paired half-member joints.

7. The enclosure construction defined in claim 6 in which the gaskets engaging the spaced concave flanges of said paired half-member longitudinal edge formations maintain the snap-engagement of the paired half-members with each other.

8. The enclosure construction in which a plurality of tubular enclosure sections as defined in claim 1 are mounted on a pneumatic tube connected with one another at adjacent tubular enclosure section ends along such pneumatic tube.

9. The enclosure construction defined in claim 8 in which the plurality of tubular enclosure sections includes axially straight and axially curved tubular enclosure sections adapted to enclose straight and curved portions of an overhead pneumatic tube installation.

* * * * *